US008622869B2

(12) United States Patent  (10) Patent No.: US 8,622,869 B2
Mourani  (45) Date of Patent: Jan. 7, 2014

(54) DRIVE TRAIN TRANSMISSION

(71) Applicant: George Dimitri Mourani, Huntington Beach, CA (US)

(72) Inventor: George Dimitri Mourani, Huntington Beach, CA (US)

( * ) Notice: Subject to any disclaimer, the term of this patent is extended or adjusted under 35 U.S.C. 154(b) by 0 days.

(21) Appl. No.: 13/726,381

(22) Filed: Dec. 24, 2012

(65) Prior Publication Data

US 2013/0172145 A1   Jul. 4, 2013

Related U.S. Application Data

(60) Provisional application No. 61/581,021, filed on Dec. 28, 2011.

(51) Int. Cl.
*F16H 37/06* (2006.01)
*F16H 57/08* (2006.01)

(52) U.S. Cl.
USPC .......................... 475/332; 475/338; 475/903

(58) Field of Classification Search
USPC .................. 475/331, 332, 338, 903
See application file for complete search history.

(56) References Cited

U.S. PATENT DOCUMENTS

| 2,944,444 | A |   | 7/1960 | Burns |
|-----------|---|---|--------|-------|
| 3,008,355 | A | * | 11/1961 | Grudin ......................... 475/334 |
| 4,825,723 | A | * | 5/1989 | Martin ......................... 475/332 |
| 4,932,929 | A | * | 6/1990 | Capewell ..................... 475/174 |
| 6,783,478 | B2 | * | 8/2004 | Larson ......................... 475/331 |
| 7,815,536 | B2 | * | 10/2010 | Jansen et al. .................. 475/159 |
| 2010/0062888 | A1 | * | 3/2010 | Ciszak et al. .................. 475/31 |
| 2010/0120573 | A1 | * | 5/2010 | Benito ......................... 475/331 |
| 2011/0111904 | A1 | * | 5/2011 | Hwang et al. .................... 475/1 |
| 2011/0165983 | A1 | * | 7/2011 | Fox .............................. 475/149 |
| 2012/0231923 | A1 | * | 9/2012 | Fox et al. ...................... 475/337 |

\* cited by examiner

*Primary Examiner* — Tisha Lewis

(57) ABSTRACT

A transmission system including a housing; a rotor supported by the housing and rotably mounted in the housing. The rotor carrying a hub, the rotor being supported in the housing by an outer tapered roller veering toward the rotor hub and an inner tapered roller bearing away from the rotor hub. The rotor having a larger diameter at the outer bearing that at the inner tapered bearing; and a single first stage compound differential planetary including an input sun gear driven by the rotor and a plurality of free planets. The single first stage compound differential planetary including an inner annular gear fixed to the rotor shaft, the compound differential planetary gear meshing the plurality of free planets with the fixed annular gears on one end and with output ring gears on the opposite end with two attached stiff rings.

12 Claims, 16 Drawing Sheets

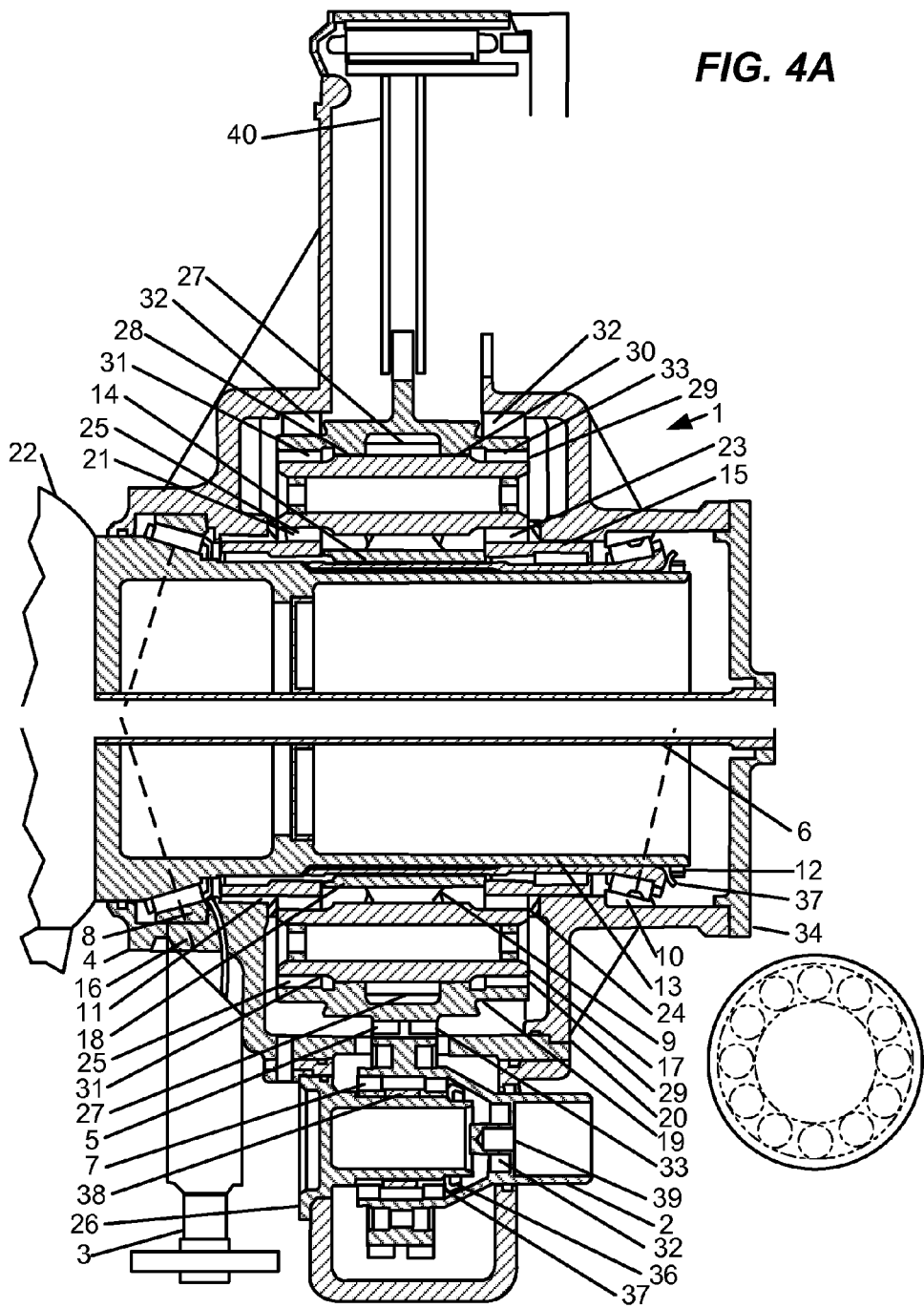

DRIVE TRAIN TRANSMISSION

This application claims the benefit and priority of U.S. Provisional Patent Application Ser. No. 61/581,021, filed Dec. 28, 2011, which is herein incorporated by reference for all purposes.

BACKGROUND

1. Field of Disclosure

The present disclosure relates to a gear train and more particularly to a transmission system for driving a generator or generators.

2. Related Art

A typical application for a transmission system is for use in wind power generating systems, including wind turbine technology. Wind turbine technology has become increasingly demanding as requirements for twenty or thirty years of life, with greater reliability, is being required. In a typical wind turbine, the turbine rotor is rotated at relatively slow speeds as wind impinges on an arrangement of expansive, radially positioned wind blades. It should be appreciated that the torque acting on the gear arrangement is large. In addition, at the base of the rotating wind blades, the loads can vary greatly and may be high, for sometimes over prolonged periods of time, and under varying speeds. In order to function reliably, it is usually critical that the gear arrangement be capable of performing under these demanding conditions.

Typical gear arrangements generally require a large number of bearings to operate properly. Some manufacturers may use direct drive systems in an attempt to eliminate extra bearings and gears. In some designs, offered in either an epicyclical single planetary arrangement, or a compound differential planetary arrangement, the designer typically begins from the outside, larger size, first stage, gearing. This makes it possible to increase the arm length and use only three planets to drive a smaller output center pinion to increase the rotational speed of the output shaft. The output shaft is connected typically using splines or a similar arrangement to a shaft which drives a generator.

Since gear arrangements typically require a large number of bearings to operate properly, the more bearings used in the gearing arrangement, the more likely is that one or more of the bearings will fail. Generally, the failure in the gear arrangement of many wind turbines, for example, is due to failure of bearings in this unusually demanding bearing environment. Thus it is advantageous to reduce the number of bearings needed in any gear arrangement.

SUMMARY

The present disclosure provides a transmission system that increases the output speed of the system using a gear arrangement, which includes multiple balanced planets, without using bearings. The gear arrangement may be used in a one or two compound differential planetary, each high in efficiency for conserving energy, to drive, for example, a radial single air gap or an axial type generator or even multiple permanent magnet (PM) generators.

The present disclosure advances drivetrain technology by depicting an innovative concept in drivetrain design configured to be used, for example, with small unit 25 KW to larger 6000 KW generators, which makes the drive train well suited, for example, to advance wind turbine technology.

The design includes a compound differential planetary gear box, which is compact, highly efficient, and bearingless, and includes the ability to diametrically add additional compound differential planetary gears of the same type to further increase the total ratio and output speed.

It is designed to drive power from the center rotor shaft radially to the outside with increased speed and lower load. This allows the ability to drive various generators in a single or multiple configuration application.

Advantageously, as described in detail below, an output ring gear and a stiff ring are combined into a single piece. Since the designed rotation and speed of the output ring gear is the same as the stiff ring, the bore of the staring may be made identical to the pitch diameter of the output ring gear and not below the root of the end planet gears. This holds the gearbox in place. A combined output member of the output ring gear and stiff ring uses two journals to stabilize outer components, such as generators, effectively acting as their bearings.

The design has the capability of using two compound differential planetaries in side-by-side (parallel) located between mainshaft support bearings to double the capacity of energy by driving two parallel generators separated by an extra housing element.

The design also has the capability of using paired, piggybacked compound differential planetaries and side bearings so that each multiplies the speed located between the mainshaft support bearings to multiply the speed of the two output gear ratios ($1^{st}$ and $2^{nd}$ stages) to obtain faster speed of the two parallel single generators.

The design also has the capability of using the extension of the low speed rotor shaft to drive a scavenge and lube pump through a front gear box adaptor to increase the pump speed for the gear train, and to accept a fixed power drive unit driven electrically or hydraulically to allow, for example, a wind turbine pitch control system with a dual load path instead of a dormant system used to drive, for example, a second rotor upwind or downwind to the primary rotor to increase the energy produced with no additional gear train.

In one aspect, the gear arrangement may be created from the center of the transmission system toward the outside using an inversion arrangement of a high efficiency compound differential planetary gear arrangement or system. The planet gear system includes a plurality of planets, for example, at least six, nine, twelve or more. The use of a relatively high number of planets reduces the load per planet. The planets are held using an inversion arrangement of a high efficiency compound differential planetary gearing arrangement where the planets are held with their gear meshes in firm 'inward' position under their tooth separating forces derived from their pressure angles. The planets are not supported by bearings but rather by the use of two internal stiff rings with journals that contain them. As a condition of equilibrium, the threes and moments about any points on the planets in or parallel to the three planes add to zero. The force balance principle of the free planet design is statically and dynamically effective in turbine drive applications and competitive in efficiency since it does not use bearings.

In one aspect, the stiff rings are integral with two output internal ring gears positioned at both ends of the drive. The components of the internal gear rotate in the same direction and at the same speed by having the journals of the stiff rings made with the same bore size as the pitch diameter of the internal ring gears for pure rolling with the planets. In addition, the planet's lands or journals are made having the same diameter size as the pitch diameter of the two end planet gears for pure rolling with their mating journals. This provides the increase in speed while the journals act as bearings for the internal ring gears, as well as support for the output speed drives of driven components with pure torque without radial forces on the compound differential planetary.

In another aspect, the output gear of the first planetary may be used to drive a second compound differential planetary of the same type in a piggy-back version to increase the total output gear ratio increaser and the speed from the first compound differential planetary. In this arrangement, the planets are free floating in symmetry and self-centering and mutually self-supporting and thus, do not require radial bearings for their radial positions. The planets axial locations are dictated by, fixed thrust washers orbiting and rolling at their instant center against fixed side washers.

In another aspect of the design application, the internal ring gears use one or two disk flanges on their outside diameter to mount a rotor of a generator. The stator may be fixed to the main housing of the transmission drive to reduce its overall outside diameter by using a speed increaser gearing with total ratio of approximately −6 to 1. The negative sign indicates that the output rotation of the internal ring gears is opposite to the input sun rotation of the compound differential planetary. Again, the journals act as bearings to support the single mounted generator.

In another aspect, the output ring gears may include an external spur gear on the outside circumferential diameter of the ring gears to drive multiple, for example up to six (6) quantities depending on the KW size required. Each generator incorporates an extended shaft with a driven gear, mounted in over-hanged position at its end. The bearings in the generator support its driven gear and the generators are mounted equally spaced around the compound differential planetary drive, thus cancelling all the separating loads from the multiple driven gears.

Alternatively, the external output spur gear of the first stage compound differential planetary can become the input gear of a similar second coaxial stage compound differential planetary. The two stages may be secured together all around in "piggy-back" fashion in a larger diameter housing. Advantageously, the total speed increase ratio is a multiple of both the first stage and the second stage. The internal ring gears of the second stage integral with stiff rings have their, journals support their output speed drive similar to the first stage description, with typical aspects.

An advantage is that the gear arrangement provides the ability to divide or split the gear housing into two halves at its mid-vertical or horizontal center.

In another aspect, the output ring gears may include an external, gear on its outside circumferential diameter to drive multiple generators equally spaced, for example, up to three or four units. Again, each generator incorporates an overhang driven gear. The bearings in each generator support its driven gear similar to the first stage description except their speed is increased by the second stage gearings used to drive the multiple generators.

With the multiple driven generators positions, the main housing uses cover lookouts to help with the installation of those generators with their extended shafts and mounted gears at each location. Thus each of the differential planetary gears do not use any bearings.

The compact compound differential planetary gear arrangement of the present disclosure, offers major weight reduction savings of approximately 20 to 40 percent relative to equivalent rotor torque arrangements. The design uses only a two-halved single main housing, which offers rigidity, less assembly time, and therefore, at a lower cost. The costs are greatly reduced by eliminating the bearings and associated machining of their three or four piece housings usually required in most gear design with hearings.

In a compound differential planetary, the total ratio is made up from a simple planetary and a differential compound planetary. The simple planetary ratio selected is less than 2 to 1 depending on the size of the unit in KW and application. The differential portion of the ratio increaser is between 2.5 to 3.5 to 1 for a total of −5 to −7 to 1. Larger total ratios may be obtained if desired, but at the expense of lower total efficiencies.

A second or third stage offset parallel-shall in a design using multiples of three or six, respectively, may be used to drive generators through their shaft extension with over-hang driven gear. The third stage design uses two compound differential planetaries that the second planetary is riding on the first stage in a piggy-back arrangement.

A wind-driven rotor may be connected to a generator via a first-stage efficient compound differential planetary gearing arrangement. This drive may be compact with a low gear ratio increaser and may have a completely hollow bore. The drive does not require bearing, since the input gear is coupled by means of an internal spline connection from the rotor main shaft. This drive permits the hub of the rotor to be integral with its main shaft. For example, the hub may be a one piece iron casting machined with an external spline connection without the use of a shrink disk. The main shaft is splined to the drive and is supported and retained in the combined hollow drive housings through bearings in overhang position and retained by means of a large locknut. The front large bearing may have the least overhanging distance to the centerline of the rotor and thus a reduced load. The two bearings are mounted in the drive housings. As shown in FIG. 6A, a mechanical fuse insert with a shear section may be added resulting in dual inner and outer input shafts. The inner shaft may be supported by dual split bronze bushings disposed inside the larger outer shaft. The mechanical fuse insert may be coupled by splines between the two shafts or by face couplings or other similar means. A parking brake may be used at the inner shaft.

The force is introduced into the compound differential planetary via an input sun external spur gear, which drives the multiple center planet gears orbiting around two fixed reaction annular external gears mounted in both ends of the doweled split housing bore by a spline in each end. The internal spline in the split housing bores are machined either by broaching them in-line or by cutting them using dual line cutters in one operation for alignment accuracy with the doweled split housing. The front large bearing can be in alignment with the torque supports of the bottom main housings to absorb the reaction moment of the main housing and direct it into the tower of the installation through a structure. As an alternative, the main housing is mounted with four-legged feet to the structure.

The gear arrangements shown provide different gear ratios for driving different types and sizes of generators available as follow's.

(1) A Modified Direct Drive Generator, modified by adding a first stage speed increaser gearing between the two rotor hearings. This allows faster speed output resulting in a design with a smaller outside diameter size, especially for a larger MW Generator, (MS1-1), reducing the amount of the permanent magnet material. Which reduces costs. This provides a slimmer width for either a radial flux machine or a multiple axial field machine, the latter with multiple generator rotors.

(2) A medium-speed generator with two stage gearing increaser, with a further reduced size modified direct drive output generator (MS1-2).

(3) A medium-speed with two stage gearing increaser, and use of five or six output generators equally spaced (MS-5 or MS-6).

(4) A fast speed generator with three stage gearings and use of three larger output generators equally spaced referred to as the Baseline.

Other aspects and features of the present invention, as defined solely by the claims, will become apparent to those ordinarily skilled in the art upon review of the following non-limited detailed description of the invention in conjunction with the accompanying figures.

BRIEF DESCRIPTION OF THE DRAWINGS

In the drawings, wherein like reference numeral denotes similar elements:

FIG. 4A shows a single stage, gearbox having a single gear ratio increaser according to an embodiment;

FIG. 4B shows a single stage gearbox also including a parallel shaft gear ratio increaser according to an embodiment;

FIGS. 7A and 713 are end and side views, respectively, of the gear system of FIG. 6B with a multiple of three generators according to an embodiment;

DETAILED DESCRIPTION

Figure 1:
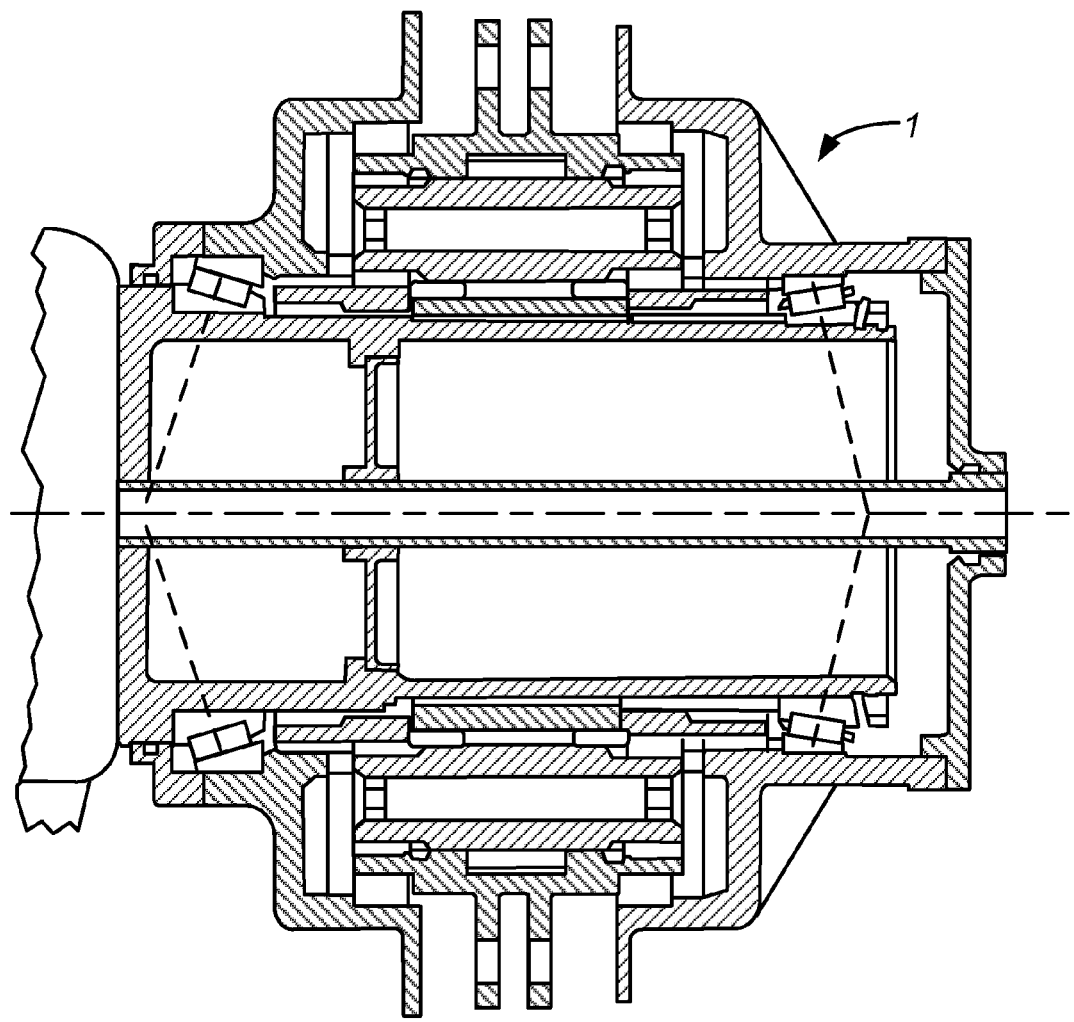
FIG. 1 shows a first stage compound differential planetary and the turbine hub and shaft according to an embodiment.

The following detailed description of embodiments refers to the accompanying, drawings, which illustrate specific embodiments of the disclosure. Other embodiments having different structures and operations do not depart from the scope of the present disclosure.

The present disclosure provides a transmission system including a gear arrangement used to drive different type generators. The gear arrangement may be driven by a power shaft from a rotor connected to an input sun gear coupled to a plurality of symmetric or balanced planets positioned in an efficient compound differential planetary gear train. In one embodiment, the high efficiency compound differential planetary arrangement, includes an input sun gear positioned at the center of its bore, an output internal ring gear surrounding the sun gear and concentric therewith as well as the reaction external ring gears of about the same diameter as the input sun ring external gear and arranged in line with it on either side. A plurality of planet gears are each positioned between the input sun gear and the output internal ring gears. The sun gear is driven by the power shaft, causing the sun gear to rotate. In another embodiment, the output internal ring gears may be connected to an individual external gear on its outside rim such that rotation of that external gear causes a rotation of a second stage of the same design connected thereto. The latter may be configured to drive a gear mounted overhang on an extended generator shafts, equally spaced.

The spur teeth of the sun gear meshes with the center set of teeth of the planet gears. The other planets set of teeth on each end also mesh with the two end sets of teeth of the reaction gears, and also of the two opposite set of teeth of the planet gears meshes on the opposite side, or output internal ring gears. Advantageously, this arrangement can balance the forces action on each planet gear, thus reducing or eliminating the need for bearings to offset these tangential forces. From the point of view of the separating forces, based on pressure angles, each planet gear is a three pinion of teeth, axially separated from each other by lands having the same diameter as the pitch diameter of two end pinions. Two internal hollow cylinders called here stiff rings are provided as an integral part of the two output internal ring gears, and thus rotate in pure rolling contact and in the same direction of rotation of the latter. The stiff rings keep the planets in engagement with their respective contact gears, under separating threes, which improves reliability to the extent they eliminate the need for bearings, which are typical sources of failure in a typical gear system.

In one embodiment, the compound differential planetary is driven with a low speed input shaft with a drive sun pinion, and includes a higher speed output shaft with two internal ring gears arranged coaxially with and embracing the input shaft. The output shaft is provided with two roiling internal journals positioned parallel to the input shaft and transfer planet gears rotatable in the internal journals parallel to the input shaft and which engage the drive pinion. The two internal ring gears engage and embrace the transfer planet gears. Two external ring gears are also coaxial to the sun gear. Both are fixed to the main housing of the gear system, and both are timed inline to each other by means of inline splines. The fixed reaction external ring gears have the same tooth numbers as the drive input pinion, but both with different diametral pitch. In one embodiment, the teeth of the external ring gears are not divisible by the number of turbine blades to reduce torsional vibration. A plurality of planet members or gears is equally spaced around and within the output internal ring gears. Each of the planet gears has two end pinions having the same tooth numbers and a center middle pinion with different tooth numbers where the latter are meshed with the low speed input shaft.

The planet members are not caged in a spider, but rather the gears are held in proper engagement with their meshing external ring gears. The output pinion, through the use of stiff rings concentric with the gear assembly, are an integral part of the output internal gears. They engage their internal journals on the planet members. Each of the planet's three gears is axially separated from each other by reduced diameter lands. The two lands are the same diameter as the pitch diameter of the two end pinions, respectively. Thus, the planet gears are held in firm, inward engagement with the fixed external gears and are free to find precise positions when under a load. This causes the torque load to be evenly distributed circumferentially between the several planet gears. Although the above described planetary gear system may be a stand-alone system, it may also serve as the first stage system of a two stage compound differential planetary gear system as shown in FIG. 9B.

A second stage gearing system, which is similar to the first stage system, may be formed around the first stage system to ride "piggyback" on the first stage system. Like the first stage system, the second stage system may include a low increaser gear ratio. The second stage gear system is a compound differential gear planetary with a higher speed input, which is based on the gear increase ratio of the first stage. An external output tooth ring gear of the first stage system embraces transfer planets with the center external teeth. Two external ring gears are fixed and secured to the same location on the gear housing as the first stage system ring gears. The external ring gears have the same tooth number as the first drive external output tooth ring gear of the first stage system. A plurality of planet gears are spaced around and within the second stage system output internal ring gears. Each of the planet gears have two end pinions with the same tooth numbers and a center pinion with different tooth numbers where the latter meshes with the input pinion of the first stage system.

Like the first stage system, the planet gears of the second stage system are not caged in a spider, but rather the gears are held in proper engagement with their meshing fixed external ring gears. The input pinion through the use of stiff rings concentric with the gear assembly is an integral part of the output internal gears. The stiff ring internal journal engages the external journals on the planet members. Each of the planet gears are axially separated from each other by reduced diameter lands. The lands are the same diameter as the pitch diameter of the two end planet pinions, respectively. Thus, the planet gears are held in firm, inward engagement with the fixed external gears and are free to find precise positions when under a load. This causes the torque load to be evenly distributed circumferentially between the several free planet gears. Although the above described planetary gear system may be a stand-alone system, it may also serve as the second stage system of a two stage planetary gear system. The fixed gears of the second stage system use the same spline connection and replace the splined spacer of the first stage, but the torque sense is opposite to the first stage system thus reducing the torque reaction to the gear housing.

FIGS. 4A and 4B show partial cross sectional views of the planets arranged with three different planets based on gear teeth selection with two optional arrangements. FIG. 4A shows a single stage gearbox with a single gear ratio increaser of, for example −5 to 1, to drive a radial flux generator.

FIG. 4B shows an additional parallel shaft spur gear with two ratio increasers that can provide a total output from about 14 to 1 up to about 20 to 1 in some embodiments. This configuration may be used to drive up to six permanent magnet smaller generators. In this embodiment, the six output pinion sub-assemblies may be removed with their respective generators without disturbing the main gear box. It should be noted that the main shaft is made integral with the turbine hub and the main shaft is necessary to assemble the gearbox.

The gearbox allows a direct connection between both rotors front and aft and may be driven at the same speed through two couplings and an extension shaft with Teflon steady rest bearings. This is shown schematically in FIG. 11, with a Rotor #1 up-wind and Rotor #2 down-wind. In this example, Rotor #2 includes support by two pillow blocks for its support to be mounted on the other end to the structure and in line with the extension shaft. The torque from each rotor are additive whether they are the same size or not, based on aerodynamic test results. This adds to the energy at very low cost since the electronics, structure and tower are available with minor modification but require adding slip discs for electrical capability through rotating shaft to both hubs.

FIGS. 4A and 4B each illustrate a transmission system which implements a symmetric, balanced transmission or gear arrangement 1. The gear arrangement 1 includes an input sun gear 18 at its center, and two output internal ring gears 19, which surround the input sun gear 18 and are concentric therewith. The input sun gear 18 may include a thick body tube with an internal spline 14 in the inner circumferential surface and a set of external gear teeth 9 formed on the outer circumferential surface. The gear arrangement 1 also includes fixed reaction ring gears 21 and 23 of approximately the same diameter as the input sun gear 18 and is arranged on both sides thereof. A plurality of planet gears 17 are each positioned between the input sun gear 18 on one side and the output internal ring gears 19 having the stiff rings integral on the opposite outer side. The planet gears 17 are equally spaced circumferentially around the input sun gear 18 and the fixed reaction ring gears 21 and 23. Thus, the differential is completely balanced.

In one embodiment, the input sun gear 18 is driven directly by the corresponding power main shaft 13 with which it is aligned and attached at the center, thus causing the input sun gear 18 to rotate with the rotation of the power main shaft 13. In the embodiment of FIGS. 4A and 4B, the rotor main shall 13 carries a wind turbine hub at its end. The main shaft 13 is mounted in main transmission housing 16 by means of tapered roller bearings 8 and 10, and is enclosed by housing cover 20. The main shaft 13 may be part of the hub of the rotor or may be flange-mounted as a separate component. In one embodiment, the main shaft 13 may define a hollow bore (passage) used to accommodate, for example, control devices for influencing a wind turbine or other device connected thereto. A tube 6 may be inserted and extend into the bore through an end cover 34 mounted to the housing cover 20. In one embodiment, main shaft 13 may accommodate independent temporary cavity sections (not shown), for example three cavity sections, to be used as temporary oil sumps to supply lubricant to the gears and bearings during start-up. The lubricant may be delivered at slow rotor start-up speed by centrifugal force through controlled radial orifices.

The input sun gear 18 is coupled to main shaft 13, such as by means of a spline 14 or similarly well-known means, located at the center of the drive train transmission housing 16. The sun gear 18 drives the force from the rotor main shaft 13 into the plurality of planet gears 17, for example, twelve or more planet gears 17, at its center teeth.

In one embodiment, the planet gears 17 are made of three pinion gears each having a first set of gear teeth 25, a second set of gear teeth 27 and a third set of gear teeth 29, axially separated from each other by reduced diameter lands 28 and 30, positioned below the root diameter of the center pinion, but at the same pitch diameter of the end pinions. The center pinion is driven by the input sun gear 18 causing the planet gear 17 to rotate about its longitudinal axis. Each of the end pinions engages the reaction ring gears 21 and 23 that are fixed to the housing in relation to the input sun gear 18 and to the output internal ring gear 19, which cause the planet gear 17 to also orbit about the axis of the input sun gear 18 as the sun gear rotates. The gear teeth 25 and 29 on the end pinions engage respectively teeth 31 and 33 on the output internal ring gear 19. However, the drive ratio of the planet gear 17 to the output internal ring gear 19 is different from the drive ratio of the planet gear 17 to the reaction ring gears 11 and 15. This causes the output internal ring gear 19 to rotate relative to the reaction ring gears 11 and 15 when the planet gear 17 is rotated. The drive ratios are such that low speed rotation of the power shaft is increased to a higher speed, but at lower torque, rotation of the output internal ring gear 19. An exemplary ratio of 5 turns of the output gear to about 1 turn of the main shaft 13 and the input sun gear 18, could be employed (in opposite rotation).

As the planet gears 17 rotate and orbit with the rotation of the output internal ring gears 19, each of the planet gears 17 is subjected to a tangential force. The moment that the tangential forces create on the teeth of the planet gears 17 are balanced. The symmetric, or balanced configuration includes output internal ring gears 19 with teeth 31 and 33, reaction ring gears 11 and 15 with teeth 21 and 23 and planet pinions teeth 25 and 29 engaged, respectively (the sun gear has been omitted for clarity. The tangential force created by the contact of the planet pinions 25 and 29 with their counterpart one of the output ring gear teeth 31 and 33 is offset by the same pinion of the opposite end contacting the opposite output ring gear teeth 33 which creates the balancing tangential force and moment. Therefore, it stabilizes the planet gear to prevent the angular position of the axis of the planet gears from shifting. Stabilizing the planet gear 17 in this way reduces the need for bearings to hold the rotational axis of the planet gears parallel to the rotational axis of the input sun gear 18 coaxial with the fixed ring gears 21 and 23. The number of planet gears may vary, but are described with 12 planets gears in these embodiments. By reducing the number of bearings needed, the likelihood of the operation of the generator and rotor being impaired due to a bearing failure in the gearbox is correspondingly reduced.

The output gear teeth 31 and 33 are also part of the output ring gears and stiff rings 19 on the outer circumferential surface and drive MULTI-PM GENERATORS, for example, five or more equally spaced, with the bottom part of the housing being used as the sump.

Figure 14:
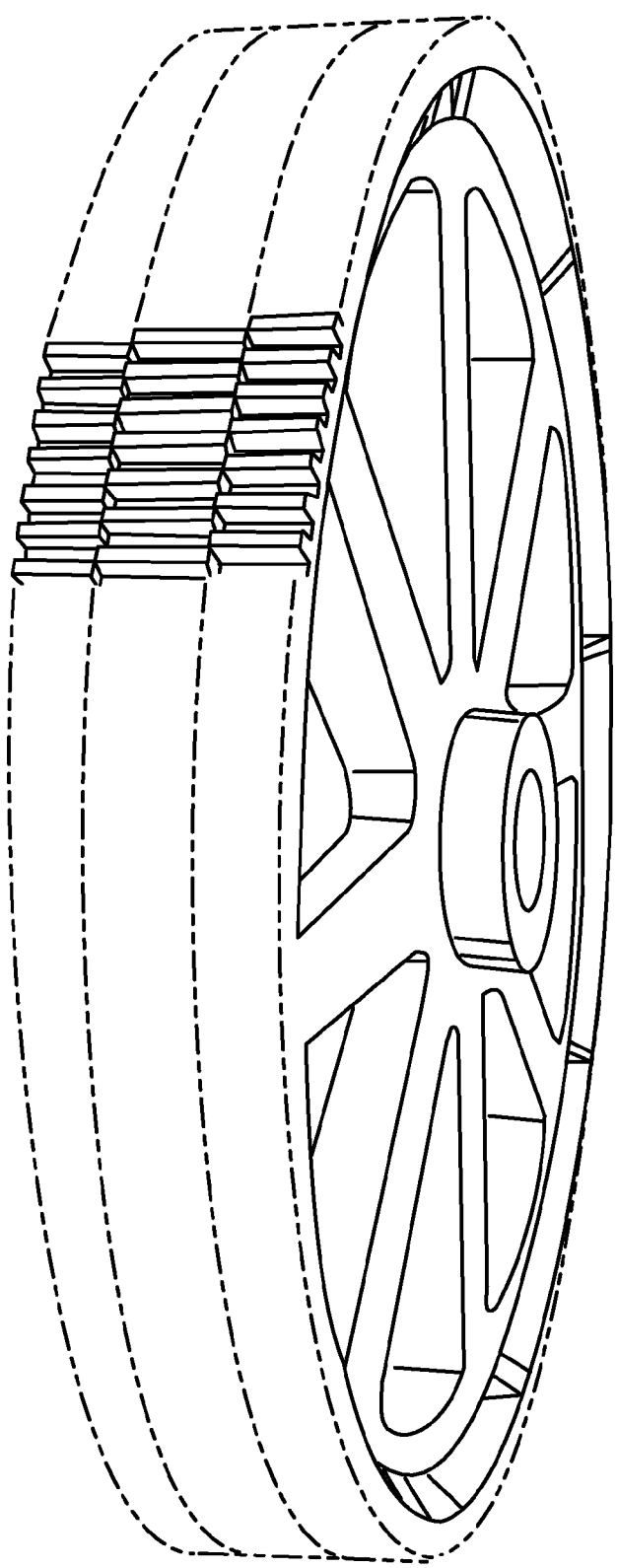
FIG. 14 shows stepped gears.

The planet gears 17 may not all be constructed similarly. The planet gears 17 may require different timing of the center teeth 27 with the two end teeth 25 and 29 for three of 12 planets 17 (or more) depending on the number of teeth selection, thus in this design, it requires four same set of planets. This allows at the same time every set of four planets to have contact of the teeth at the same tooth position, while the other two sets at advanced or retarded tooth positions, short of calling them stepped gears as shown in FIG. 14.

The efficiency of the selected compound differential planetary of FIGS. 4A and 4B is expected to be about 97 percent at 100 percent rated torque at rated speed, and 96.5 percent at 75 percent rated torque and speed, and about 96 percent at 50 percent rated values and about 95 percent at 25 percent rated values. The pure differential ratio selected is about −2.8 to 1 or higher, up to −3.2 to 1 depending on number of teeth selected while the total ratio increaser is averaging between about −5 to −5.7 to 1.

The compound differential planetary stage with 11, 15, 25. ? and 33 gear teeth can be made with helical teeth systems in which case the axial forces of the reaction, planet and output gears listed above are all compensated. The reaction gears are compensated against the housing on one end and cover on the other end while the planet end gears and the output gears are compensated in themselves in compression and in tension respectively and the advantages of helical tooth systems, such as smoother running properties and higher carrying capacity and efficiency may be used but at a higher cost.

Drive fluctuations, which in a wind turbine system, for example, may be due to irregular wind conditions or other effects, are alleviated or compensated for by using double splined fuse inserts between the main shaft and the input sun and the output spline and generator spline. The fuse insert may be made from Kevlar or equivalent. The fuse insert is capable of being used to disconnect the turbine from the gearbox at a torque value above the maximum encountered, but lower than the yield of the selected material.

For a helical gear, reversal of direction of rotation causes a reversal of direction of thrust force T, while for herringbone gears, the thrust is eliminated.

$$T = F \tan B$$

$$TC = T' \times PR'$$

For the planet gears, the helix angles is opposite on one end versus the other end so the thrust are opposed and cancel each other like a herringbone gear.

The gearing-side end of the rotor shaft 13 is mounted with a large tapered roller bearing 8 which is supported in the main housing 16. The bearing 8 is virtually in alignment with the two torque supports 3 which absorb the reaction movement of the main housing 16 and direct it into the tower of an installation. The tilting moment of the rotor shaft 13 is supported via a smaller bearing 10. In the embodiment, shown, the bearing 10 may be arranged inside the housing cover 20 if used and the rotor shall 13 is held axially by a locknut 12. Other mounting designs of the drive train transmission may include four-legged lugs to overcome all the threes and moments that occur which are passed into the main housing 16.

Figures 6A, 6B:
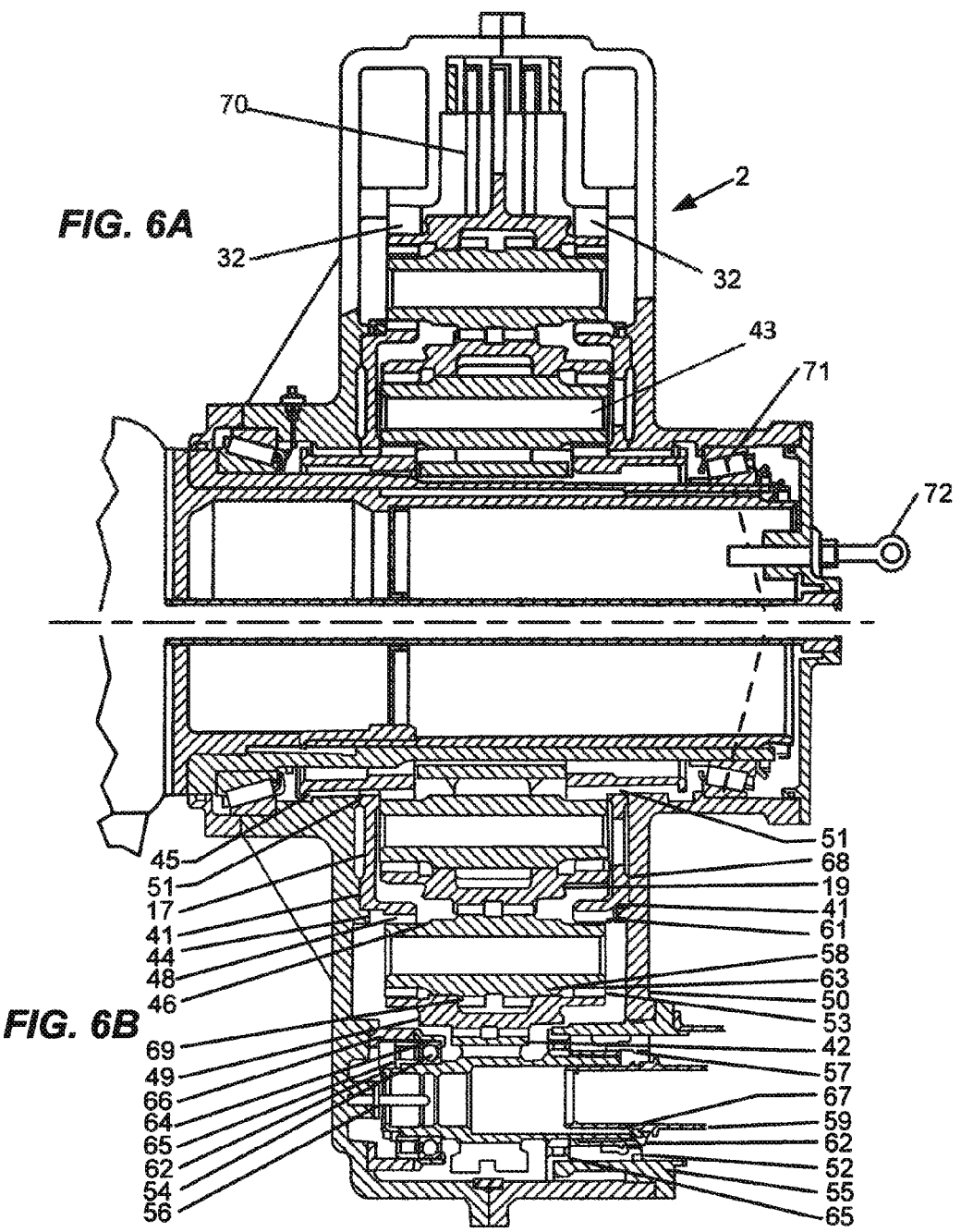
FIGS. 6A and 6B show a two stage gearbox with both stages having similar type designs, where the second stage being "piggy backed" over the first stage according to an embodiment.

FIGS. 6A and 6B show a two stage gearbox with the second stage surrounding the first stage. This embodiment uses the same type of compound differential planetary as shown in FIGS. 4A-4B and 5A-5B, and has two alternate types of generator outputs. FIGS. 6A and 613, show a second stage gear arrangement 2, similar to the first stage gear arrangement 1 (FIGS. 4A-4B and 5A-5B), that may be mounted on the first stage gear arrangement 1 or made to ride "piggy-back" on the latter. The second stage gear arrangement 2 is driven through its first stage output annular ring gear and use larger diametrically split housings without using bearings. Both stages are secured together by their output one piece annular gears. The total speed increased ratio is the multiplication of both stages. The embodiment of FIG. 6A, for example, may use a total gear ratio increaser of up to 30 to 1, to drive an axial field generator. The embodiment of FIG. 6B, for example, may use an additional parallel shaft gear ratio increaser for a total increase from about 72 to 1 to about up to 105 to 1. This may be used to drive a multiple of three large, equally spaced permanent magnet generators. Each generator can be removed with its driven gear on its shaft and can be inspected for gear contact without disturbing the main gearbox installation. Removal and reassembling each generator to the main transmission requires the assembler to observe the decoupling or coupling the gear meshes through each window of the main housing.

As shown in FIGS. 6A and 6B, the gear arrangement 2 includes three gear stages to accomplish a baseline design which requires higher total gear ratio (e.g. 72-105 to 1). The first stage gear arrangement is described above with reference to FIGS. 4A and 4B. The second stage gear arrangement 2 is of similar design of a compound differential gearing with the output external gear of the first stage providing the input to that second stage drive. The drive surrounds the first stage gear arrangement (piggy back ride) and uses a larger diameter extension of both the same type housing and cover that envelope it. The length of the rotating second stage unit may be smaller since the torque load may be less than 5 times smaller based on the increase of the first stage gear ratio. The torque may be less because the radius of the input gear and its arm is about 2 times larger. The tangential force is then about 9 times smaller but its output RPM speed is increased by a factor of approximately 6 times of the first stage RPM.

The second stage is also of the same type symmetric, or balanced, compound differential planetary drive. The gear train is driven by the output external gear 19 at the center of the first stage. In this design, the output external gear 19 of the first stage becomes the same input sun gear 19 of the second stage since it is the same part called out on the drawing (FIG. 4B). We will call it second input sun gear 19. Again the second stage output ring gears 49 surrounding the second input sun gear 19 and concentric therewith as well as the fixed reaction external ring gears 41 of the approximately same diameter as the second input sun gear 19 and arranged in line with it on both sides. The fixed reaction external ring gears 41 are fixed to ground or housing at the same spline location of the first stage replacing spacers 24 (FIG. 4B). In this arrangement, the torque is in the opposite direction thus subtracting from the reaction torque of the first stage to the housing.

A plurality of new planet gears are each positioned between their second input sun gear and the output internal gear. The sun gear of the second stage is also the first stage output external gear, the sun gear to rotate. The outputs internal ring gears are of the same type design as the first stage which are integral with the stiff rings and are connected to an individual external herringbone (referred to as dual split helical gears) on its outside rim such that its rotation of the third stage parallel herringbone external gear when connected. In one embodiment, the herringbone type gear may be used to reduce the gear noise and dictate the location of the output gear, where the latter is supported by the generator bearings.

Figure 7A:
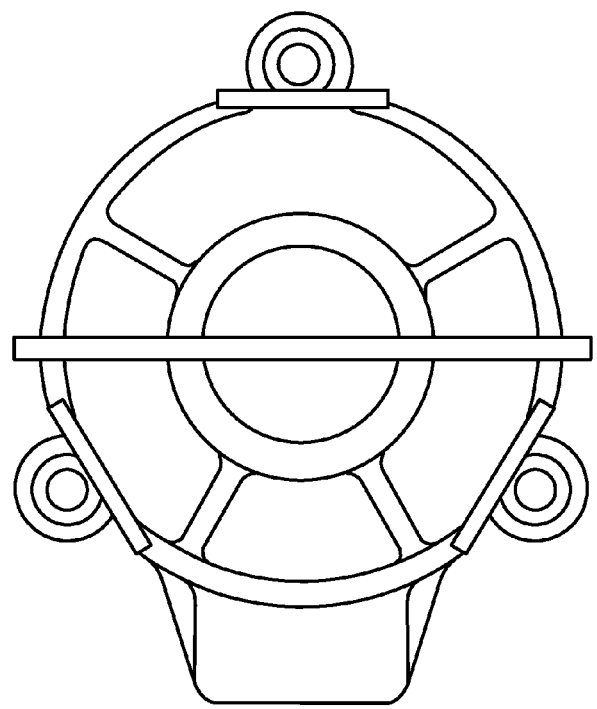
Figure 7B:
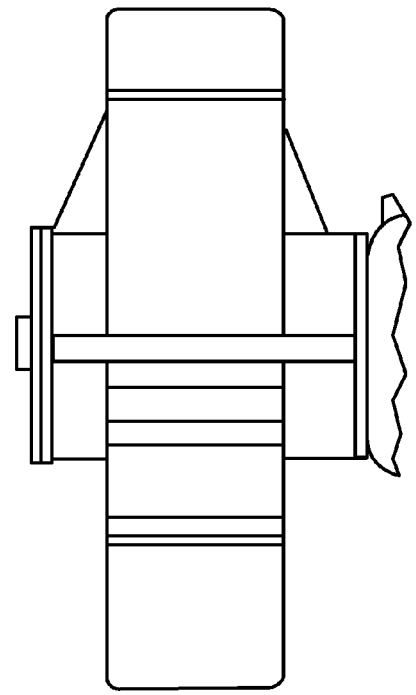

The second stage includes the same features as the first stage and thus operates as described with regard to FIGS. 7A and 7B. For example, the input sun gear of the second stage is of the same type as the first stage regarding the planets, the land grooves diameter and their sizes as the pitch diameter of their two end pinions and the stiff rings same direction of rotation as the output ring gears in pure rolling contact etc. thus making one piece. Other designs of the one piece output internal ring gears can be made split into two parts at its middle. With dual flanges they can sandwich the flanges of the rotor shaft of the one single generator type and its fixed stator. The two journals position the rotor of the single generator without bearings.

The second stage gearing is now described in more detail with reference to FIGS. 6A and 6B. FIGS. 6A and 6B show that the gearbox has its own mainshaft to be assembled without the need for the turbine mainshaft with its hub. The transmission is positioned between the two bearings of the mainshaft. Also, the transmission can be in an overhang position on the extension wind turbine mainshaft spline connection. The transmission does not need support from the mainshaft except for mounting the external input sun gear with its internal spline, it can be mounted directly to the wind turbine structure, but in line with the turbine centerline. The journals keep the rotating part in position, but the transmission has dual seals at each end to prevent oil leaks. The latter is assembled in the center of the gearbox assembly and held in position with a lock washer and a locknut by removing the small end cover 32.

The gear system of FIGS. 6A and 6B includes a symmetric, balanced gear train. The gear train being a low differential planetary arrangement, with a low pure differential ratio of less than −3.5 to 1 and a total ratio of about −6 to 1. The second stage includes at its center an input sun gear 19 of the first stage. The latter is surrounded with two output ring gears 49 and concentric therewith as well as the two fixed reaction external ring gears 41 of approximately the same diameter as the input sun gear 19 and arranged in time with it on both sides. Again, the reaction external ring gears 41 are fixed to ground or housing at the same spline location of the first stage replacing spacer 24 (FIG. 4B). A plurality of planet gears 43 are each positioned between the input sun gear 19 and the two fixed reaction ring gears 41 on inner side and the output ring gears 49 and its stiff rings, on the opposite outer side, the planet gears 43 normally being equally spaced circumferentially about the external sun gear 19 and the reaction gears 41 and again with timed teeth in multiple of four in this case (other multiple planet's numbers that are used depends on the number of teeth selected for a particular ratio as well as the size of the turbine in KW selected).

Each planet gear 43 in a pinion having first 48, second 69 and third 63 sets of teeth, axially separated from each other by reduced diameter land 46 and 58 below the root of the second or center pinion 69 but machined and ground exactly at the pitch diameter of end pinions 48 and 63 respectively. The second or middle set of teeth 69 is driven by the external input sun gear 19 of the first stage, causing the planet gear 43 to rotate about its longitudinal axis. The first and third pinions gear set 48 and 63 also engage respectively the reaction external ring gears 41, which are fired in relation to the sun gear 19, planet 43 and output gears 49 causing the gear planet 43 to also orbit about the axis of the second input sun gear 19 rotates. The first and third set of teeth 48 and 63 of the planet gear 43 engages respectively teeth 53 of the output internal ring gear 49 is different from the drive ratio of the planet gear 43 to the fixed reaction ring gears 41, thus causing the output ring gear 19 to rotate relative to the reaction ring gear 41 when the planet gear is rotated. The drive ratio is such that the speed rotation of the input is increased to a higher speed but lower torque of the output gear. An exemplary increased ratio of about −6.0 turns of the output gear to about 1 turn of the external input sun gear 19 could be employed.

As the planet gears 43 rotate and orbit with the output ring gear 49, each of the planet gears 43 is subjected to a tangential force and the moment it creates on the planets gear teeth are balanced as in such conventional balanced configuration is shown here. The symmetric, or balanced, configuration is shown schematically in FIG. 8.

The symmetric, or balanced, configuration has an output ring gear 49, second stage external input sun gear 19 and planet gear 43 of planet respectively and the input sun gear 19 with center pinions teeth 69 of the planet gear 43. The tangential force created by the contact of the input sun gear 19 and with one of the two output gears teeth 53 is offset by the same sun gear on the opposite clad contacting the opposite output ring gear's teeth 53 which creates the balancing tangential force and moment. Therefore, it stabilizes the planet gear 43 to prevent the angular position of the axis of the planet gears from no shifting at all.

Stabilizing the planet gear 43 in this way reduces the need for bearings to hold the rotational axes of the planet gears parallel to the rotational axis of the input sun gear 19 and the ring gear 49. Having a plurality of equally spaced planet gears 43 further reduces the need for bearings to hold the axis of the input sun gear 19 coaxial with both the fixed external gears 41, there being 12 planets gears or more can be selected for larger capacity in these embodiments.

The second external input sun gear 19 includes the outer circumferential of the first stage gearing and has a set of teeth, which is the driver of the second stage gearing. The output gears teeth 53 are also part of the internal output ring and the stiff rings on the extreme outer circumferential surface being a herringbone design drives another herringbone parallel gear 42 in the third stage output to the generators.

Again, the planet gears 43 are not all constructed similarly. They require different gear teeth dining of the center teeth 69 with the two end teeth 48 and 63 for assembly purpose. They require in this embodiment three different gear tooth timing (or more depending overall teeth selection). In this case, they require four same set of planets where 12 planets were selected. This allows at the same time every same four planets to have contact of the teeth at the same tooth position while the other two sets each makes its own contact at different tooth position, so the twelve planets gears sequentially have their contact at different position, short of calling them stepped gears. (See FIG. 14)

The efficiency of the selected second stage compound differential planetary is expected to be more efficient than the first stage due to their finer pitch and pure differential ratio is less approximately less than 3.5 to 1 and the total ratio is about −6 to 1 increase.

Figure 2:
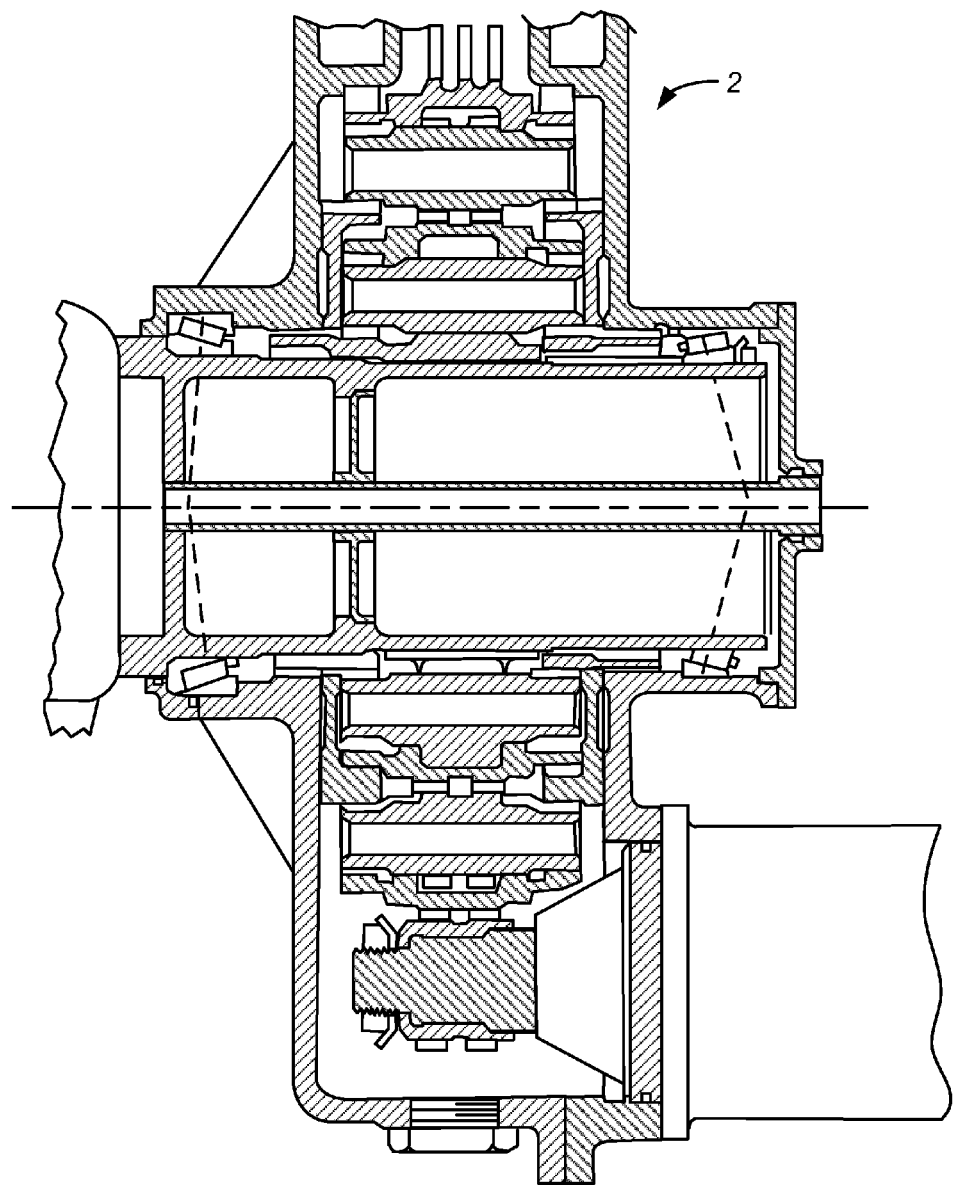
FIG. 2 shows the combined first and second stage compound differential planetaries according to an embodiment.

FIGS. 6A and 6B each show two different application options. The first option (#1) is a piggy back single generator with a triple air-gap axial field machine. The second option (#2) is a third stage parallel-shaft herringbone gears with a plurality circumferentially, equally spaced (equivalent) gears members with their generators for equal loadings on the second stage output gear 49. Those parallel gears with their shafts can each be part of each generator to be bolted and doweled to the main housing that accepts them by means of window viewing. This allows the replacement of the generator for repair without removing the whole gear train transmission and makes the housing stronger with the over-hang shaft design. (FIG. 2)

FIGS. 7A and 7B are end and side views, respectively, of the gear system of FIG. 6B (option #2) with a multiple of three generators. In this embodiment, the main housing can be split in half at its mid horizontal center and thus allow removing the upper half for inspection if needed and reinstall it back by re-bolting and re-doweling it back in its original place for the multiple generator design.

Figure 8:
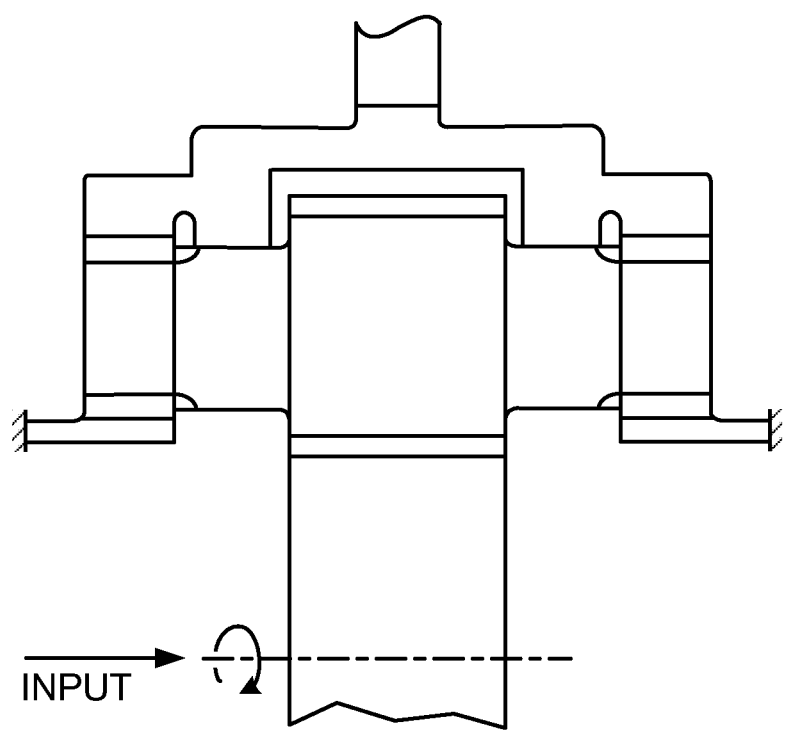
FIG. 8 is a schematic illustration of the planet forces to three planes, radial tangential and transverse, according to an embodiment.

FIG. 8 is a schematic illustration of the planet forces to three planes, radial tangential and transverse, according to an embodiment.

Figure 9A:
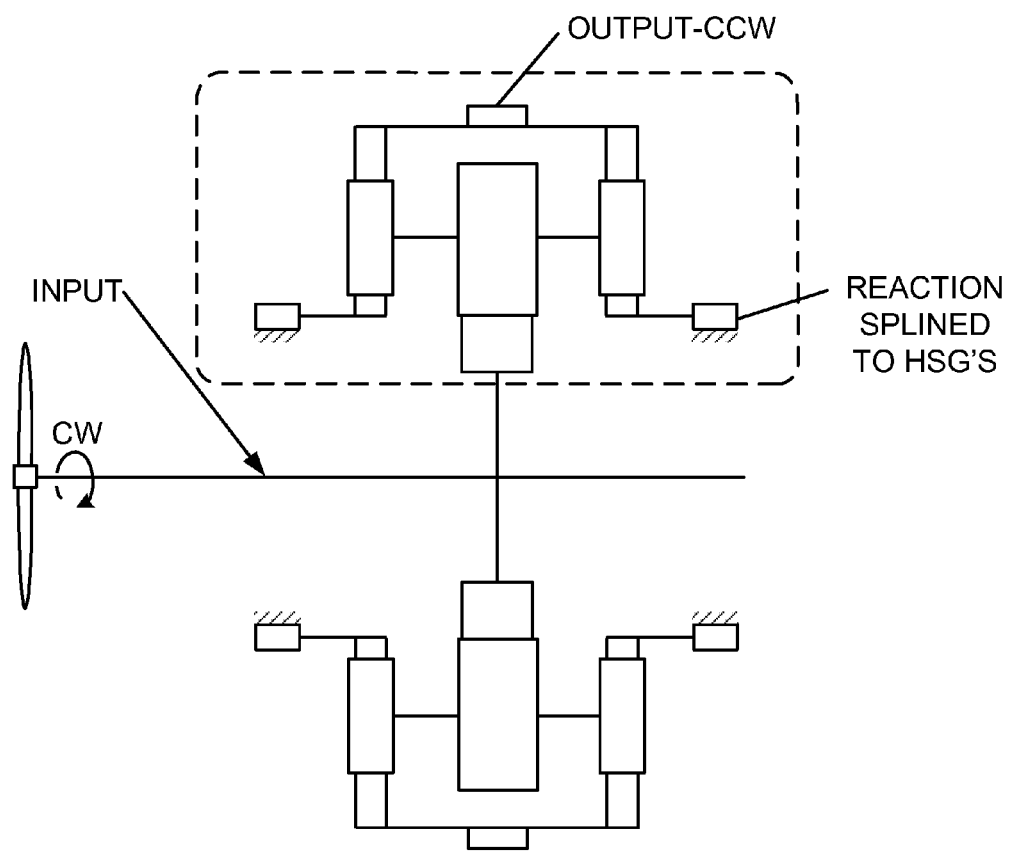
FIG. 9A is a schematic illustration of the gear trains of FIGS. 4A, 4B, 5A and 5B according to an embodiment.
Figure 9B:
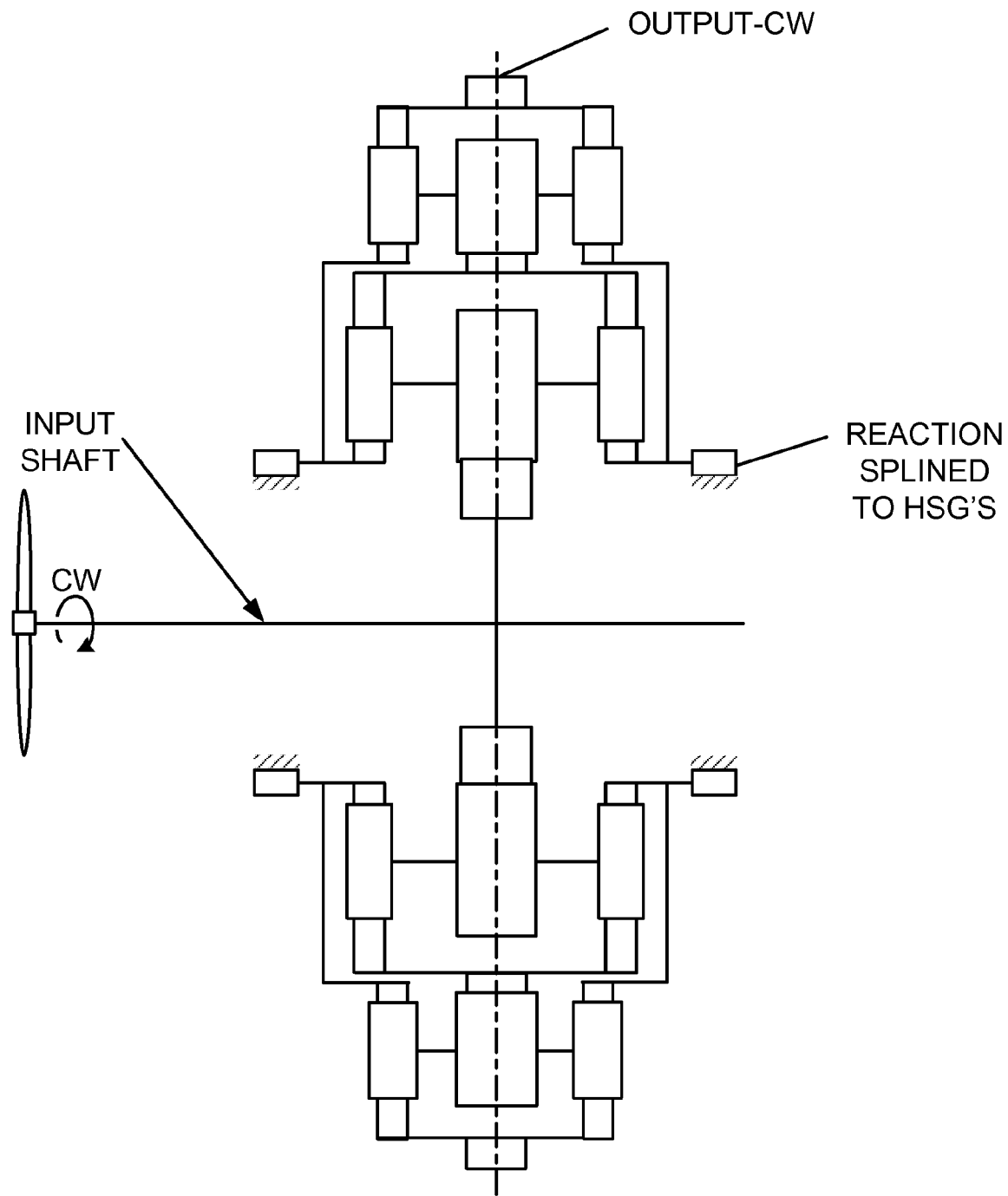
FIGS. 9B and 9C are schematic illustrations of the gear trains of FIGS. 6A and 6B according to an embodiment.
Figure 9C:
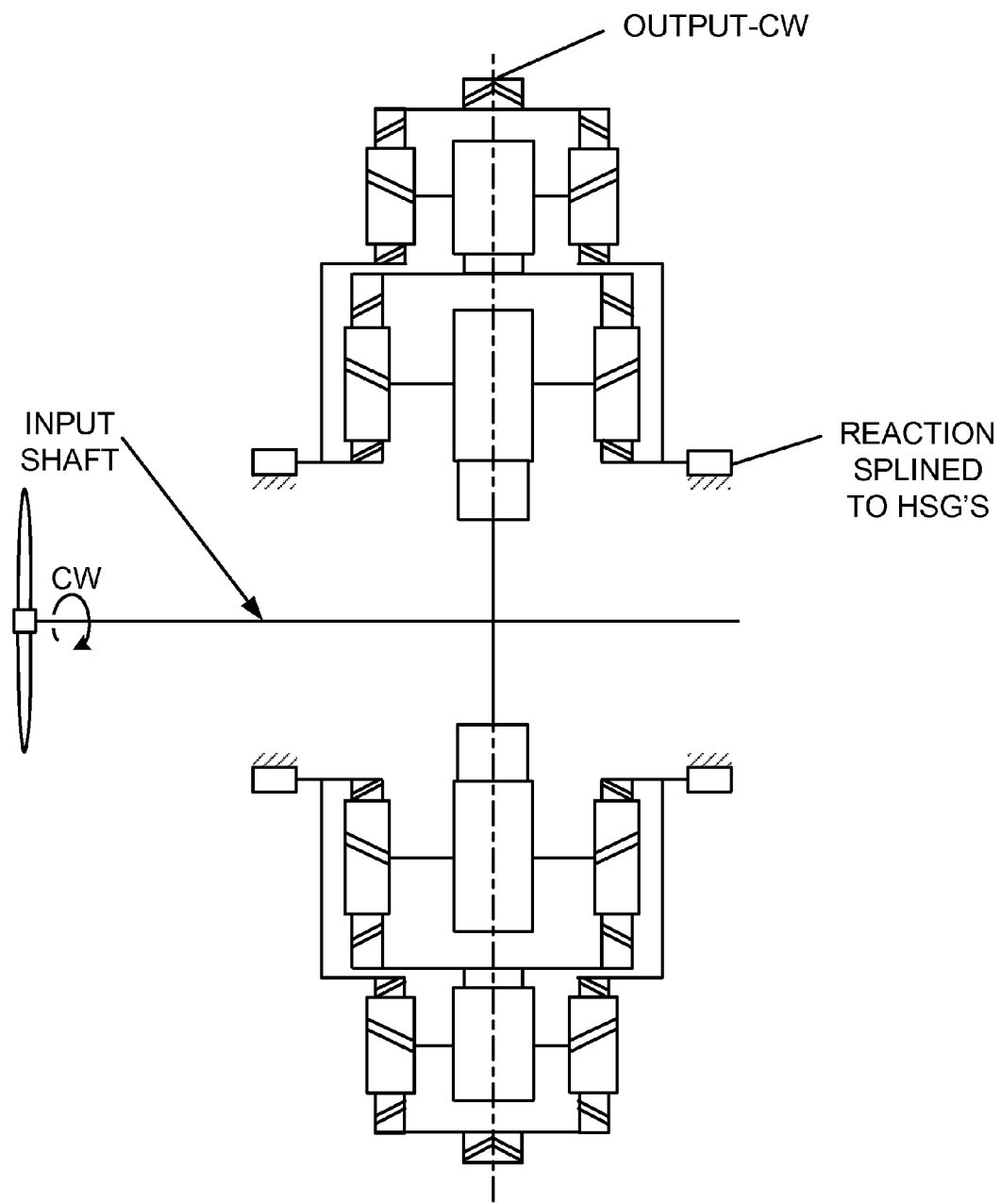

FIG. 9A is a schematic illustration of the gear trains of FIGS. 4A, 4B, 5A and 5B according to an embodiment. FIG. 9A shows the schematic for the spur geartrain of the first stage compound differential planetary system. FIG. 9B shows the spur geartrain of a combined first and second stage compound differential planetary gears. FIG. 9C is a schematic illustration of the helical geartrain of the combined first and second stages of the compound differential planetary gears.

Figure 10:
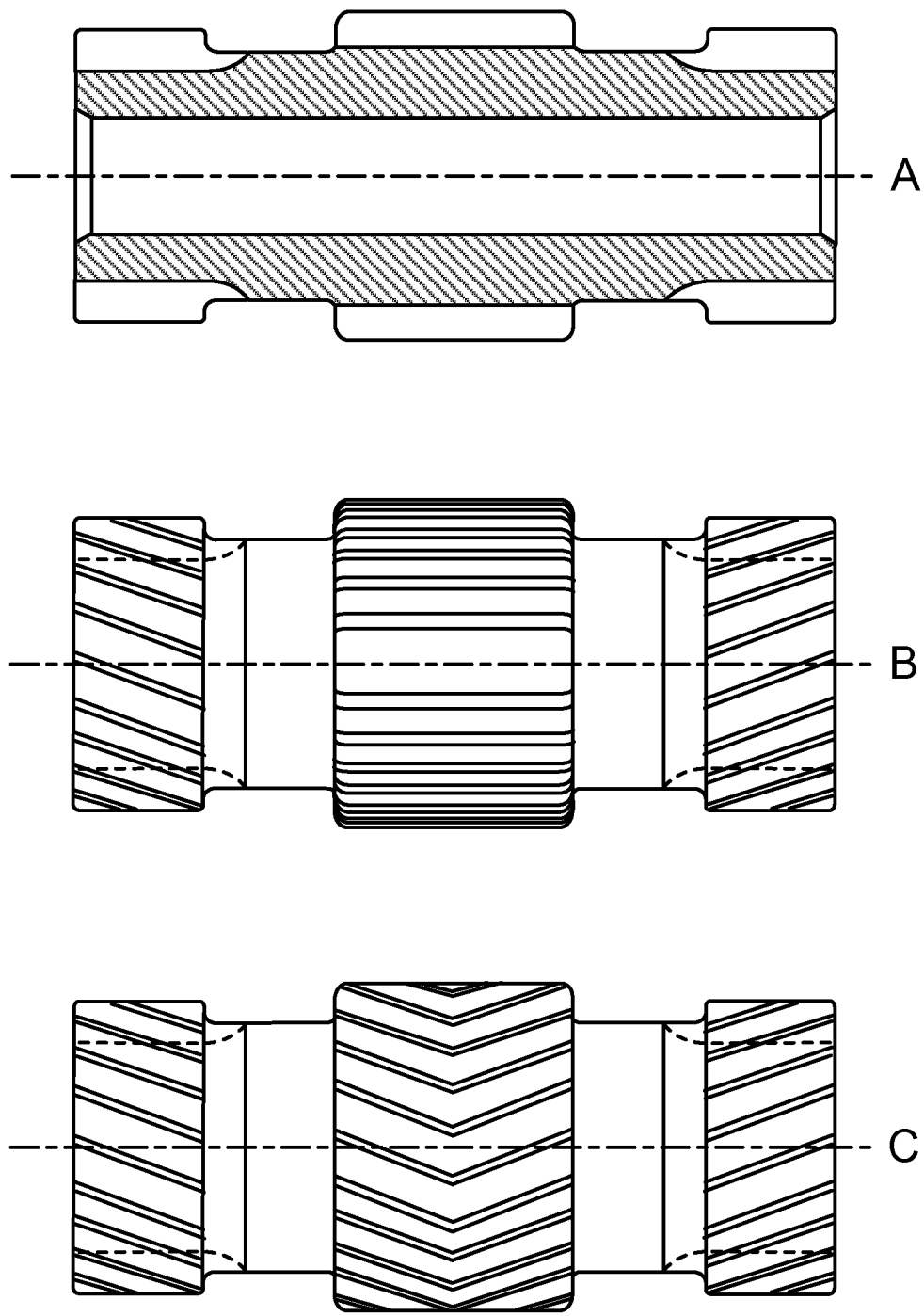
FIG. 10A is a representative cross section of either FIG. 10B and FIG. 10C according to an embodiment.
FIG. 10B is an illustration of spur center gears with helical end gears according to an embodiment.
FIG. 10C is an illustration of split herringbone center gears with helical end gears according to an embodiment.

FIG. 10B is an illustration of spur center gear with helical end gears according to an embodiment and FIG. 10C is an illustration of herringbone center gears with helical end gears according to an embodiment.

Figure 11:
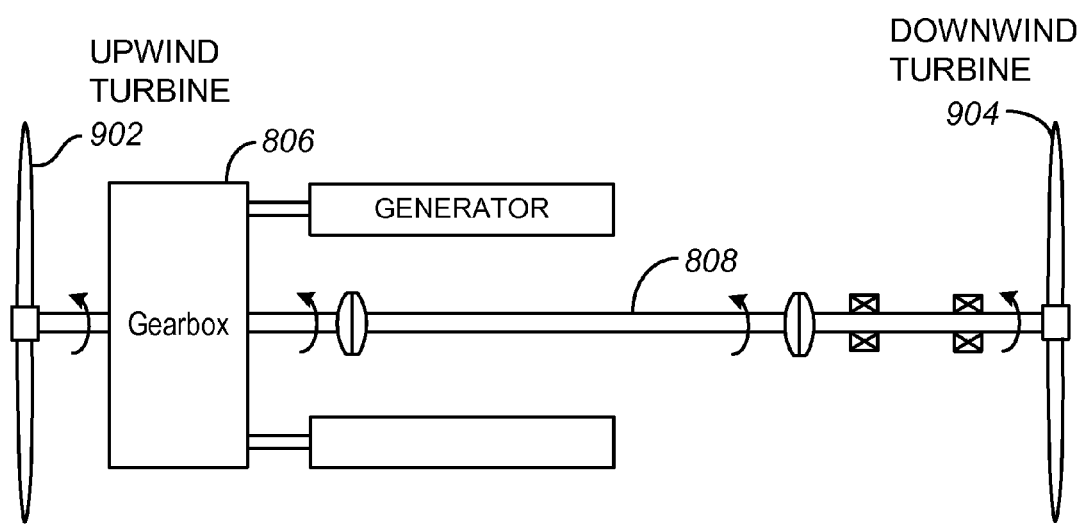
FIG. 11 is a schematic illustration of two wind turbines, one upwind and one downwind driving the same type gear box according to an embodiment.

FIG. 11 is a schematic illustration of two wind turbines 902 and 904, one upwind and one downwind, both driving the same gear box 806 from both ends at the same speed. The downwind turbine 904 may be supported by two pillow blocks and an extension shaft 808 with two couplings at each end to connect to the gearbox mainshaft.

Figure 12:
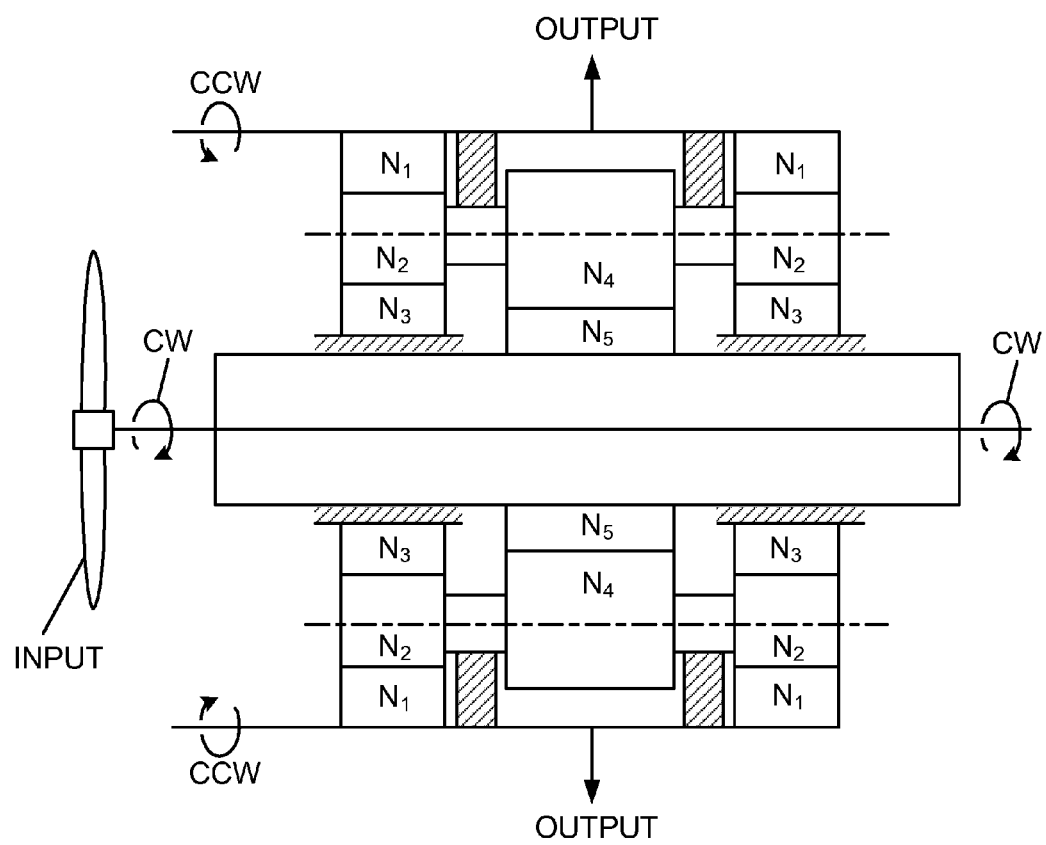
FIG. 12 is a schematic diagram for stage gearing for input to output using the compound differential planetary gears and the gear ratio increaser equation according to an embodiment.
Figure 13:
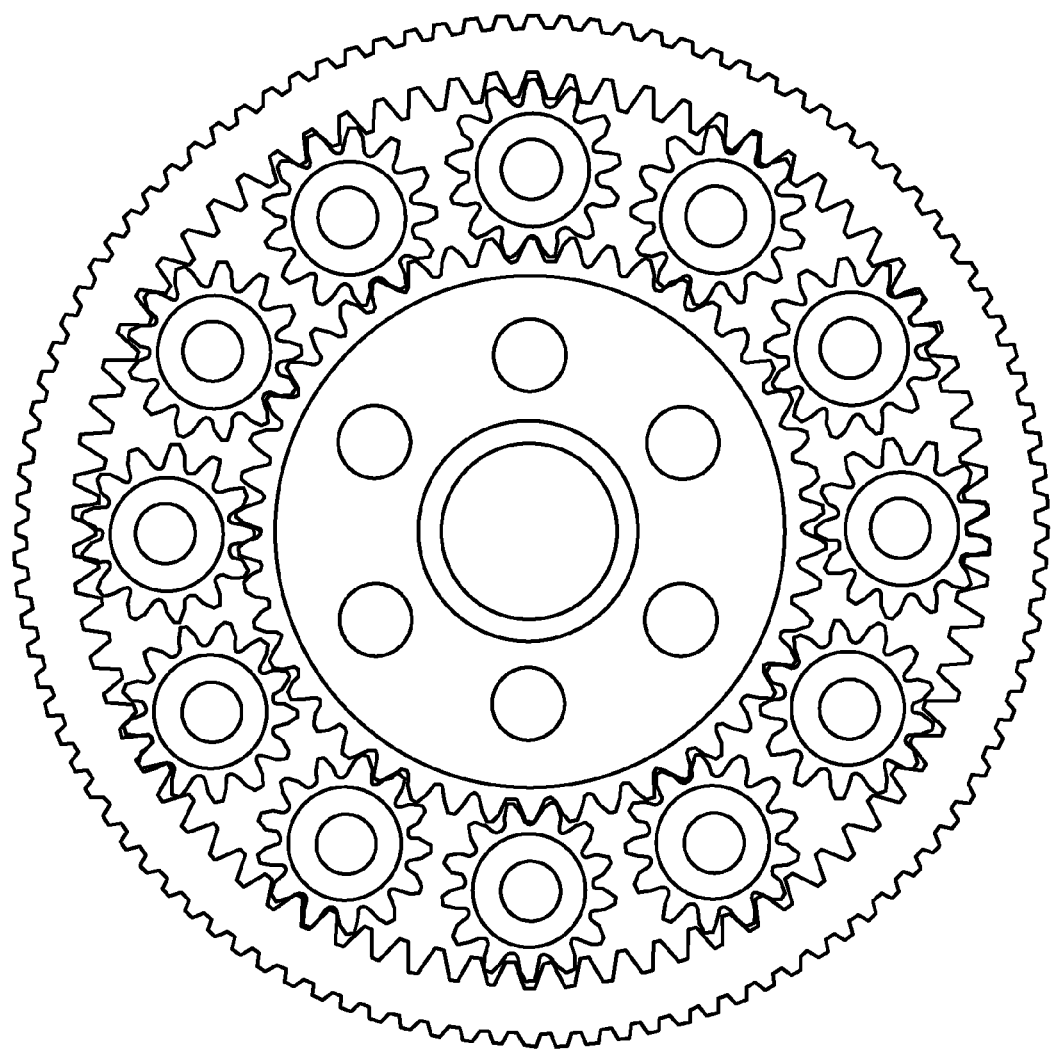
FIG. 13 shows a cross-section through the twelve planets with their timings according to an embodiment.

FIG. 12 is a schematic diagram for stage gearing for input to output using the compound differential planetary gears as described herein according to an embodiment.

Since the planetary gear system does not use bearings except for the rotor turbine main tapered roller bearings, the gearbox housing can use sleeve liners for the turbine tapered roller bearings, so that the housing can then be made of a lighter material, such as from an aluminum forging, for example, since no other bearings are used in the gearbox (see FIG. 2).

Figure 3:
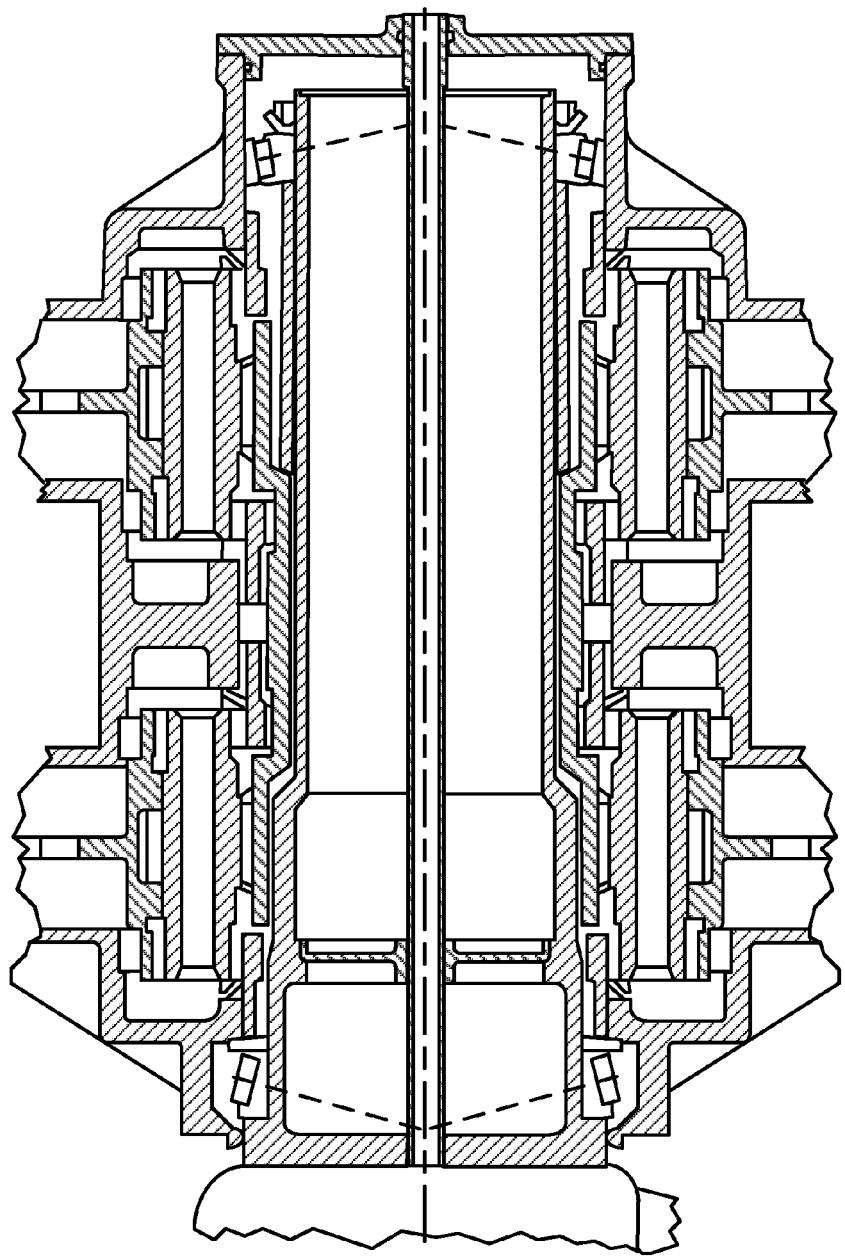
FIG. 3 shows two first stage of a Paired compound differential planetaries located side-by-side between the mainshaft support bearings to drive two single generators and as in FIG. 2, two first and second stages of paired compound differential planetaries according to an embodiment.
Figure 5A:
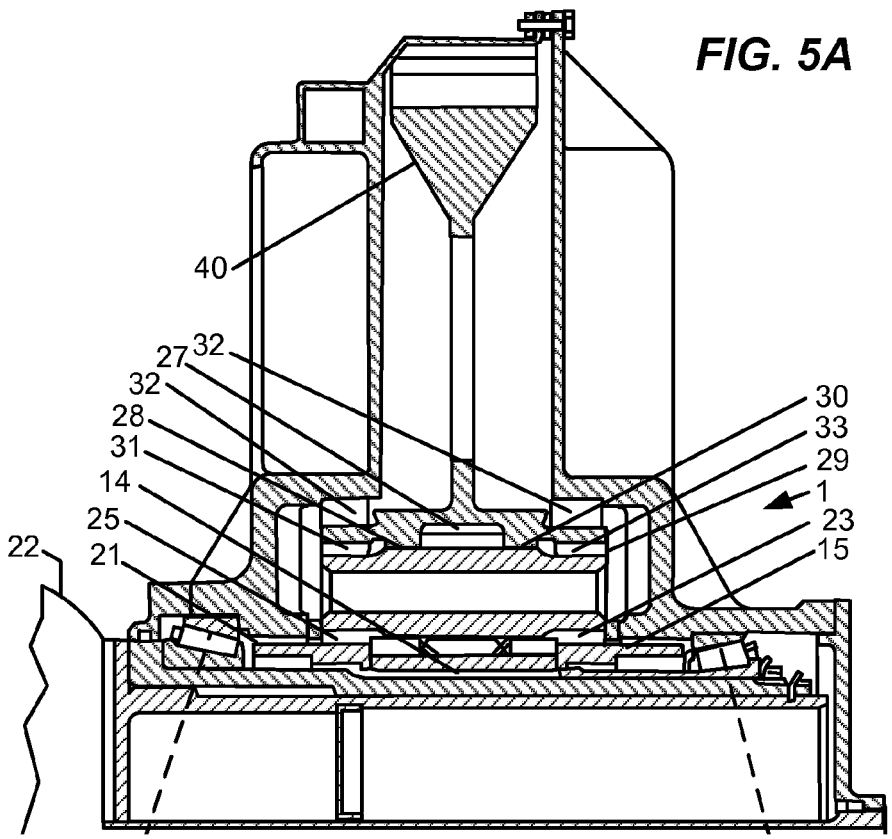
FIGS. 5A and 5B show the single stage gearbox of FIGS. 4A and 4B having its own mainshaft to be assembled without the need for the turbine mainshaft with its hub according to an embodiment.
Figure 5B:
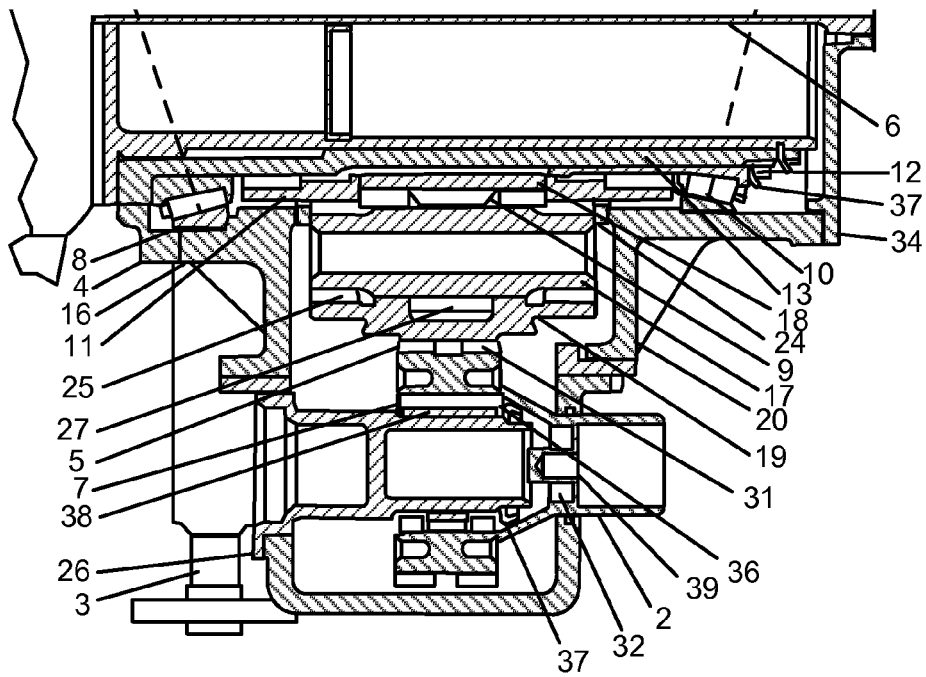

Referring now to FIG. 1 and FIG. 2, the same basic design using paired compound differential planetary transmissions in parallel is used to augment the capacity to produce double the energy as shown in FIG. 3. This embodiment uses dual sets of planetary transmissions over and around the same size diameter main shaft drive, but longer length to accommodate the two transmissions side by side between the main shaft and two supporting spherical roller bearings. The design uses an additional intermediate housing member to the main basic housings, sandwiched in between them to provide support and separation to the dual transmissions and their two separate driven generators. The compound differential planetaries use a gearbox ratio increaser of about 6 to 1 with its $1^{st}$ stage gearing to reduce the overall diametric size for each of the generators running at higher speed. With a combined $1^{st}$ and $2^{nd}$ stage bearings for the paired planetaries with a total ratio of about 35 to 1 increaser will further reduce the sizes of each generator under the same power generated under their higher running speeds. If the capacity of each gear system is 6000 KW for example, then the capacity of the two units on FIG. 3 would be 12,000 KW to drive two independent generators of the same size.

The best location selected for the drive train transmission is to be between the two supporting bearings to the main turbine rotor shaft center location. The two bearings are being installed in the main housing of the transmission for the best and minimum envelopes, weight and cost.

Another location possible for the drive train transmission (not shown) is to be located at the far end of the main turbine rotor shaft in an overhang position to the shaft through an extended splined connection to the input sun gear and/or gears. The gearbox assembly does not require any bearings for its own support except for its mounting to structure for its torque reaction, but the input sun gear of the compound differential planetary depends on its mounting to the wind turbine rotor for its concentricity with the drive train transmission. The advantage of this end location is the assembly of the drive transmission can be done after the main turbine motor shaft is assembled with its pillow blocks and installed to the structure. This location allows removal of the transmission and works the repair without disassembly of the wind turbine mainshaft.

Although not shown, the embodiments of FIGS. 1 and 2 for each drive train transmission may be located in an overhang position with respect to the mainshaft support bearings.

In the transmission system of the present disclosure, the gearbox selected can be driven from both ends as shown in FIG. 11, which shows two wind turbines (one upwind and one downwind) both driving the gearbox at the same speed to obtain more energy.

Also, the transmission further includes the differential planetaries first assembled with the output ring gears with stiff rings in position and then the planetaries placed in bores while the fixed ring gears are inserted in each part of the housing before the input ring gear is assembled and the housing parts bolted together. The output ring gears with their stiff rings supported by the planetaries under their separate outward loads and are free floating, and they conform to the concentricity of the drive and, thus support the rotor of the direct drive single generator.

The differential planetaries are very efficient with their differential portion of the ratio equal to or less than 1/3.50 to 1. The selection of teeth to obtain the 1/3.5 or less to 1 is to make the input sun gear and the fixed ring gears with the same number of teeth, preferably, not divisible by the number of blades.

The embodiments disclosed herein are to be considered in all respects as illustrative, and not restrictive of the invention. The present invention is in no way limited to the embodiments described above. Various modifications and changes may be made to the embodiments without departing from the spirit and scope of the invention. The scope of the invention is indicated by the attached claims, rather than the embodiments. Various modifications and changes that come within the meaning and range of equivalency of the claims are intended to be within the scope of the invention such as location of the transmission with respect to the main turbine rotor shaft support bearing, one between the two bearings or two at the end in over-hang position. Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

Nomenclature of FIGS. 4A, 4B, 5A and 5B:
1. Drive Train Transmission
2. Parallel Shaft Spur Gear—Option 2 with multiple generators
3. Torque Support
4. Cover
5. Input Sun Gear, 2nd stage—Option 2
6. Tube
7. Bearing, Roller—Option 1 Design
8. Tapered Roller Bearing, Small
9. External Gear Teeth
10. Tapered Roller Bearing, Small
11. Reaction Ring Gear
12. Locknut
13. Power Main Shaft
14. Internal Spline
15. Reaction Ring Gear
16. Man Transmission Housing
17. Planet Gears
18. Input Sun Gear
19. Output Internal Ring Gears and Stiff Rings
20. Housing Cover
21. Reaction Ring Gears
22. Hub Rotor
23. Reaction Ring Gear
24. Washer, Splined
25. First Set of Gear Teeth of Planet 17
26. Fixed Shaft
27. Second Set of Gear Center Teeth of Planet 17
28. Diameter Land of Planet 17
29. Third Set of Gear Teeth of Planet 17
30. Diameter Land of Planet 17
31. Output Internal Ring Gear Teeth
32. Dual Magnetic Seals—Option 1
33. Output Internal Ring Gear Teeth—Option 2
34. End Cover
35. Pin, Anti-rotation—Option 2
36. Locknut Option 2
37. Lockwasher—Option 2
38. Spacer—Option 2.
39. Plug—Option 2
40. Single Generator, PM—Option 1

Second Stage Callout, see FIGS. 6A and 6B:
19. Output internal Ring, Gears and Stiff Rings/Output External Gear/Second Input Sun Gear
32. End Cover
37. Output Internal Ring Gears
41. Fixed Reaction External Ring Gears—2 Shown
42. Parallel Shaft Gear (multiple of 3)
43. Planet Gears
44. Spacer—Anti-rotation
45. Snap Ring—TNT
46. Journal—Land
47. Bearing, Roller
48. First Set of Gear Teeth of Planet 43
49. Output internal Ring Gears and Stiff Rings
50. main Housing
51. Reaction Spline
52. Seal, Magnetic
53. Output Internal Ring Gear Teeth
54. Bearing, Split, Ball
55. Retainer, Roller Bearing
56. Jet, Lube
57. Spacer, Seal
58. Journal, Land
59. Split, Cover
60. Seal
61. Spacer, Anti-rotation
62. Nut
63. Third Set of Gear Teeth of Planet 43
64. Retainer, Ball Bearing
65. Bearing. Roller
66. Retainer, Roller Bearing
67. Spline, Output $3^{rd}$ Stage
68. Bolt, Fixed Gear
69. Second Set of Gear Center Teeth of Planet 43
70. Single Generator. Axial Field Type
71. Mechanical. Fuse Insert
72. Rotor Lock

What is claimed is:

1. In a wind driven turbine, having a plurality of rotatable blades and a transmission drive, the transmission drive comprising:
a rotatable gear drive for supplying power from the wind driven turbine to at least one single generator; and
at least two compound differential planetary gears, a first differential planetary gear coupled to a rotor main shaft and operatively engaged with an output gear and a second differential planetary gear mounted concentric with the second differential planetary gear, and operatively engaged with the output gear,
the compound differential planetary gears each comprising:
an input sun gear driven by the rotor main shaft;
two divided output internal ring gears and two stiff ring gears formed as one piece surrounding the input sun gear, the output internal ring gears coupled to an external drive to effect rotational drive;

two fixed reaction external gears on both sides of the input sun gear with the same number of teeth and coaxial with said input sun gear; and a plurality of planet gears each disposed between the reaction external gears and the input sun gear on one side and the output internal ring gears on the opposite side, said planet gears engaging the reaction external gears at axially spaced locations, the drive ratio between the planet gears and the output ring gears being different from the drive ratio between the planet gears, the reaction external gears and the input sun gears.

2. The transmission drive of claim 1, wherein said reaction external gears have a fixed rotational position relative to the longitudinal axis of the input sun gear.

3. The transmission drive of claim 2, wherein said input sun gear is coupled to the rotor main shaft to be driven at the same rotational speed.

4. The transmission drive of claim 1, wherein each of said planet gears comprises:

a first set of teeth in engagement with one output ring gear and one reaction external gear on the opposite side;

a second set of teeth axially spaced from the first set of teeth and engaged with the input sun gear; and a third set of teeth axially spaced from the second set of teeth engaged with an other output ring gear on one side and the other reaction gear on the opposite side of the input sun gear.

5. The transmission drive of claim 1, wherein journals of the planet gears associated with the stiff ring gears keeps the planet gears with their gear meshes in firm inward position under their tooth separating forces derived from their pressure angles with said stiff rings gears.

6. The transmission drive of claim 4, wherein the external lands of the planet gears are equal to the pitch diameter of the first and third set of teeth adjacent thereto, and are below a root diameter of the second set of teeth positioned there between.

7. The transmission drive of claim 1, wherein a moment created by a tangential force acting on each set of planet gears, where said teeth of said first set engage an output internal ring gear and fixed reaction external gear, is offset by the forces acting on a the third set on an other output internal ring gear and fixed reaction external gear by an equal and opposite moment created by the tangential force acting on said planet gears.

8. The transmission drive of claim 4, wherein an outside diameter of the input sun gear is sized to pass to its position without interfering with an outside diameter of the first and second set of teeth when being assembled.

9. In a wind driven turbine, having a plurality of rotatable blades and a transmission drive, the transmission drive comprising:

a rotatable gear drive for supplying power from the wind driven turbine to at least one single generator; and at least two planetary gear stages, each stage including compound differential planetary gear trains, a first stage coupled to a rotor main shaft, and a second stage operatively engaged with an output gear of the first stage, the first stage mounted concentrically with the second stage, the compound differential planetary gear trains each comprising:

an input sun gear driven by the rotor main shaft;

two divided output internal ring gears and two stiff ring gears formed as one piece surrounding the input sun gear, the output internal ring gears having the output gear on an outside rim to drive the second stage and effect rotational drive;

two fixed reaction external gears on both sides of the input sun gear having the same number of teeth and coaxial with said input sun gear; and a plurality of planet gears each disposed between the reaction external gears and the input sun gear on one side and the output internal ring gears on the opposite side, said planet gears engaging the reaction external gears at axially spaced locations, the drive ratio between the planet gears and the output ring gears being different from the drive ratio between the planet gears, the reaction external gears and the input sun gears.

10. The transmission drive of claim 9, wherein journals of the planet gears associated with the stiff ring gears keeps the planet gears with their gear meshes in firm inward position under their tooth separating forces derived from their pressure angles with said stiff ring gears.

11. The transmission drive of claim 9, wherein each of said planet gears comprises:

a first end gear in engagement with one output ring gear and one reaction external gear on the opposite side;

a middle gear axially spaced from the first end gear and engaged with the input sun gear; and a second end gear axially spaced from the middle gear engaged with an other output ring gear on one side and the other reaction gear on the opposite side of the input sun gear.

12. The transmission drive of claim 11, wherein external lands of the planet gears are equal to the pitch diameter of the first and second end gears adjacent thereto, and are below a root of the middle gear.

* * * * *